United States Patent [19]
Pohl et al.

[11] Patent Number: 5,294,583
[45] Date of Patent: Mar. 15, 1994

[54] USE OF COLLOIDAL SILICA SOL AS AN AUXILIARY FOR CATALYSTS

[75] Inventors: Joachim Pohl, Duesseldorf; Gerd Goebel, Cologne; Franz-Josef Carduck, Haan, all of Fed. Rep. of Germany

[73] Assignee: Henkel Kommanditgesellschaft auf Aktien, Duesseldorf, Fed. Rep. of Germany

[21] Appl. No.: 890,603

[22] PCT Filed: Dec. 21, 1990

[86] PCT No.: PCT/EP90/02289

§ 371 Date: Sep. 14, 1992

§ 102(e) Date: Sep. 14, 1992

[87] PCT Pub. No.: WO91/10509

PCT Pub. Date: Jul. 25, 1991

[30] Foreign Application Priority Data

Jan. 12, 1990 [DE] Fed. Rep. of Germany ....... 4000692

[51] Int. Cl.$^5$ .............................................. B01J 21/08
[52] U.S. Cl. ..................................................... 502/232
[58] Field of Search .................................. 502/232, 244

[56] References Cited

U.S. PATENT DOCUMENTS

| | | | |
|---|---|---|---|
| 2,375,738 | 5/1945 | White | 252/309 |
| 2,574,902 | 11/1951 | Bechtold et al. | 252/313 |
| 2,577,484 | 12/1951 | Rule | 252/313 |
| 2,724,701 | 11/1955 | Legal | 252/313 |
| 2,892,797 | 6/1959 | Alexander et al. | 252/313 |
| 2,904,580 | 9/1959 | Idol | 260/465.3 |
| 2,941,958 | 6/1960 | Connor, Jr. et al. | 502/232 |
| 3,007,878 | 11/1961 | Alexander et al. | 252/313 |
| 3,146,210 | 8/1964 | Baldwin | 252/455 |
| 3,216,954 | 11/1965 | Howk et al. | 252/165 |
| 3,230,034 | 1/1966 | Stiles | 502/244 |
| 3,767,595 | 10/1973 | Montgomery | 502/244 |
| 4,199,479 | 4/1980 | Wilkes | 252/457 |
| 4,855,273 | 8/1989 | Pohl et al. | 502/244 |
| 4,855,274 | 8/1989 | Upchurch et al. | 502/339 |
| 4,935,556 | 6/1990 | Pohl et al. | 568/885 |

FOREIGN PATENT DOCUMENTS

| | | |
|---|---|---|
| 0199443 | 10/1986 | European Pat. Off. . |
| 0280982 | 9/1988 | European Pat. Off. . |
| 0309048 | 3/1989 | European Pat. Off. . |
| 3706658 | 9/1988 | Fed. Rep. of Germany . |
| 8808329 | 11/1988 | World Int. Prop. O. . |

*Primary Examiner*—Carl F. Dees
*Attorney, Agent, or Firm*—Ernest G. Szoke; Wayne C. Jaeschke; Norvell E. Wisdom, Jr.

[57] ABSTRACT

The invention relates to the use of colloidal, stabilized silica sol as an auxiliary for stabilizing and/or increasing the activity of catalysts which show a tendency towards activity-reducing sintering under high-temperature conditions.

16 Claims, No Drawings

USE OF COLLOIDAL SILICA SOL AS AN AUXILIARY FOR CATALYSTS

BACKGROUND OF THE INVENTION

1. Field of the Invention

The present invention is concerned with catalysts and relates to the use of colloidal, stabilized silica in sol form as an auxiliary for stabilizing and/or increasing the activity of catalysts which show a tendency towards activity-reducing sintering during production and/or use under high-temperature conditions.

b 2. Statement of Related Art

According to Ullmanns Encyklopädie der technischen Chemie, IVth Revised and Extended Edition, 1977, Vol. 13, pages 525-537, the suitability of catalysts for industrial processes is based on the four properties of selectivity, useful life, mechanical strength and, above all, activity. The activity of a catalyst, i.e. the extent to which a catalyst accelerates the speed of conversion of the starting materials, is determined both by the chemical properties of the active components and by the topography of the surface. Activity and surface are proportional to one another, i.e. the larger the specific surface, for example through edges and corners of the crystal form or through pores and pore volumes, the higher the activity of the catalyst. Reductions in the activity of a catalyst in use are often attributable to sintering of the surface. At relatively high temperatures above all, the crystallites coalesce as a result of increasing mobility of the surface units into relatively large crystals of lower surface energy, so that the specific surface decreases.

To prevent sintering, either the active components are applied to the surface of an inert, high-melting substance (support) or so-called stabilizers (structural protectors) are incorporated in the crystalline phase.

Known structural stabilizers are oxides, hydroxides and the salts—thermally decomposing into oxides and hydroxides—of aluminium, titanium, thorium, cerium, chromium, magnesium, calcium, barium, strontium, zinc, manganese, hafnium, lanthanum, zirconium, beryllium and silicon, particularly where the compounds are used in the form of dispersions, gels or sols. By virtue of its chemical inertia and its high melting point, particularly in the form of sols, silica may readily be added to catalysts. Suitable silica sols are any of the commercially available types which may differ in their silicon dioxide content, their stabilization and the particle size of the silicon dioxide particles, cf. U.S. Pat. Nos. 2,574,902; 2,577,484; 2,724,701 and 2,375,738.

Silica sols may be used for catalysts inter alia both as binders and as structural protectors which, occasionally, are also referred to as interspersants or spacers.

Silica sols generally show binder properties when the content of silicon dioxide particles in the catalysts is so high that crosslinking silicon-oxygen superstructures are formed, as in the acrylonitrile catalysts of the Sohio process (U.S. Pat. No. 2,904,580), which contain quantities of 30 to 70% by weight silicon dioxide, expressed as solids.

It is known from U.S. Pat. No. 3,216,954 that silica sols inter alia may also be used to prevent crystal growth and/or agglomeration in mangano-chromia-manganite catalysts. According to the Examples, silica sols are added before co-precipitation in quantities of approximately 30% by weight, expressed as solids and based on catalytically active salts. However, it is clear from the disclosure of the above-cited patent specification that the catalysts produced using silica can only be used when the process temperatures can be effectively controlled and do not exceed 700° C.

According to U.S. Pat. No. 4,199,479, an increase in the activity of hydrogenation catalysts containing zinc and copper oxide is obtained by addition of silica sol in quantities of 1 to 30% by weight and preferably in quantities of 15% by weight, expressed as silicon dioxide and based on the final catalyst. However, these catalysts are also exposed to temperatures of only up to 500° C.

DESCRIPTION OF THE INVENTION

Object of the Invention

In industry, however, there is a need to use catalysts which undergo no activity-reducing sintering, even under high-temperature conditions. For example, (emission) combustion reactions are preferably carried out under high-temperature conditions for which such high-temperature-stable catalysts would be extremely interesting.

Accordingly, the problem addressed by the present invention was to stabilize and/or increase the activity of catalysts, which basically show a tendency towards activity-reducing sintering in production and/or use, by the use of colloidal silica so that these catalysts may even be exposed to high-temperature conditions involving temperatures of more than 700° C.

SUMMARY OF THE INVENTION

Contrary to the technical teaching described in U.S. Pat. No. 3,216,954, it has now surprisingly been found that the activity of catalysts can be stabilized or even increased, optionally up to 1200° C., by using colloidal stabilized silica sol in quantities of less than 15% by weight, expressed as solids, of silicon dioxide and based on the final catalyst.

Accordingly, the present invention relates to the use of colloidal, stabilized silica sol, of which the silicon dioxide particles optionally contain foreign metals partly incorporated at the surface, for stabilizing and/or increasing the activity of catalysts, which show a tendency towards activity-reducing sintering during production and/or use at high temperatures, in quantities of less than 15% by weight, expressed as silicon dioxide particles and based on the final catalyst.

DESCRIPTION OF PREFERRED EMBODIMENTS

The production and properties of the silica sols used in accordance with the invention are described in U.S. Pat. Nos. 2,574,902; 2,577,484; 2,724,701; 2,375,738; 2,892,797; 3,007,878 and 3,146,210. The preferred silica sols according to the invention are used in the form of opalescent to optically clear, aqueous solutions of which the spherical silicon dioxide particles have a preferred diameter of at least 5 and at most 30 nm. The preferred silica sols according to the invention have a large BET specific surface, preferably of larger than 100 to 500 $m^2/g$, more preferably in the range from 125 to 300 $m^2/g$ and, most preferably, in the range from 150 to 250 $m^2/g$. In one particular embodiment of the present invention, the surface of the silica sol used is completely and/or, more particularly, predominantly occupied by silicon dioxide molecules which, in their stabilized form, may be regarded as silanol groups. According to the invention, it is possible to use silica sols of which the particle surface is formed at least predominantly by silicon dioxide molecules or silanol groups and partly by silicon-replacing, tetracovalent and/or tricovalent foreign atoms, more particularly aluminium. Preferred silica sols are those of which the surface is completely occupied by silicon dioxide molecules or silanol groups. The production of modified silica sols such as these is described in U.S. Pat. Nos. 2,892,797 and 3,007,878.

To avoid condensation of the surface silanol groups to higher agglomerates (gelation) the particles of the silica sol are preferably alkali-stabilized. Suitable stabilizing agents are the inorganic and/or organic compounds known to the expert which are soluble in aqueous medium and which show an alkaline reaction, more particularly alkaline earth metal, alkali metal hydroxides and/or ammonia and/or amine compounds, providing they are not harmful to the catalyst. According to the invention, it is preferred to-use stabilizers which are volatile at the temperatures at which the catalyst is produced and/or used, more particularly the readily volatile ammonia. The volatility of the stabilizer is advantageous to the use of the silica sols in accordance with the invention because, under high-temperature conditions, volatile stabilizers by volatilizing create more pore cracks and pore enlargements in the catalyst surface which presumably increases the activity of the catalyst.

According to the invention, ammonium-stabilized silica sols having silicon dioxide solids contents of more than 10% by weight to 50% by weight and preferably from 30 to 50% by weight are used.

In one embodiment of the invention, the colloidal, ammonium-stabilized silica sols are added to the catalyst as an auxiliary in quantities of about 2 to 15% by weight, preferably in quantities of 3 to 10% by weight and, more particularly, in quantities of 5 to 10% by weight, expressed as silicon dioxide solids and based on the final catalyst. Where quantities of more than 15% by weight silica are used, a reduction in the activity of the catalyst was observed, above all at temperatures above 700° C. In view of the relatively large quantities of silicon dioxide, overlapping silicon-oxygen skeletal structures may possibly be formed (agglomeration), reducing the size of the catalyst surface or even enveloping the catalyst crystallites.

The silica sols used in accordance with the invention are incorporated in the catalyst-forming mass as an additive during production of the catalyst before the catalyst mixture is exposed to the temperatures which lead to sintering.

According to the invention, it has proved to be of advantage to incorporate the silica sols under pH-stable sol conditions during production of the catalyst, preferably at mildly alkaline pH values and more preferably at pH values in the range from 9 to 11.

Through the use of the colloidal, ammonium-stabilized silica sols as an auxiliary in accordance with the invention, the catalysts containing them, in contrast to catalysts with no colloidal silica, may be exposed to high temperatures during production and/or use without any danger of activity-reducing sintering. In other words, the use of the colloidal silica in accordance with the invention stabilizes and/or increases the activity of catalysts which are exposed during production and/or use to high-temperature conditions involving temperatures above 700° C. to 1200° C. and, more particularly, in the range from 750° C. to 1100° C.

The catalysts containing colloidal silica in accordance with the present invention may be used, for example, in the methanization and/or purification of gases (oxygen and/or hydrogen and/or nitrogen oxides).

According to the invention, the colloidal silica sols are preferably used in reaction masses based on copper chromite which are used as acid-resistant catalysts in the direct hydrogenation of carboxylic acids.

Acid-resistant catalysts such as these which are suitable for the hydrogenation of carboxylic acids are already known and are described, for example, in German patent application P 39 33 138.5 and in DE-OS 37 06 658. In the methods typically used for the production of these acid-resistant catalysts, the catalyst-forming mass containing copper hydroxyammonium chromate is initially exposed to temperatures above 450° C. (calcination), resulting in the formation of copper chromate. The catalyst precursor containing copper chromate is then subjected to a high-temperature reaction in which acid-resistant spinel compounds of the copper chromite type are formed.

According to the invention, ammonia-stabilized silica sols of the type described above are homogeneously incorporated in the quantities described above either in the catalyst-forming mass or in the catalyst precursor in accordance with patent application P 39 33 138.5 and DE-OS 37 06 658. In either case, the colloidal silica sol should be incorporated before exposure to high temperatures. In a particularly preferred embodiment, the colloidal silica is incorporated during formation of the catalyst-forming mass. The catalyst-forming mass is advantageously obtained by precipitation of copper and chromium salts in ammoniacal medium (see p 39 33 138.5) in the presence of the ammonia-stabilized colloidal silica sol. After calcination, the catalyst precursor is exposed to high temperatures of at least 750° C.

Catalysts which have been produced using colloidal silica show very much better BET surface values than corresponding catalysts with no colloidal silica. Accordingly, when used in the direct hydrogenation of carboxylic acids, the catalysts containing colloidal silica produce higher conversions of reacted alcohols, in other words the catalyst shows higher activity.

According to the invention, colloidal silica sols may also be used in catalysts which show a tendency towards activity-reducing sintering during their use in reactions although they are not exposed to high-temperature conditions. Thus, the colloidal silica sols may be used in accordance with the invention in catalysts of the type used in the conversion and purification of olefins from aromatic compounds and in the dehydrogenation and hydrogenation of, for example, styrene and/or its derivatives and of divinyl benzene, butadiene and aromatic alkyl compounds. In these applications, the catalysts have longer useful lives, i.e. they may be used for longer periods in the particular process without having to be replaced because of sintering.

EXAMPLES

EXAMPLE 1

In a stirred tank 1, 85 g barium sulfate, 294 g manganese nitrate and 2493 g copper nitrate were dissolved in 9 liters deionized water. 550 g Ludox AS 40 were added to the clear solution. The mixture was heated to 70° C. In a second stirred tank, 1693 g chromium(VI) oxide were dissolved in 9 l water. 3600 g of a 25% ammonia solution were added to the resulting solution. The solution was then heated to 70° C. A precipitate was formed by pumping the metal ion solution in stirred tank 1 to the ammonium chromate solution in stirred tank 2. The precipitate was washed free from nitrate and dried. The precipitate was then calcined for 12 hours at 750° C., the acid-resistant catalyt (copper(II) chromite) accumulating in powder form. After calcination, the catalyst had a BET surface of 21 m²/s.

10 g of the catalyst powder were reacted with 500 g lauric acid methyl ester for 5 hours in a stirred autoclave at a temperature of 220° C. under a hydrogen pressure of 250 bar. The product was analyzed by gas chromatography:

| | |
|---|---|
| Lauric alcohol (dodecanol): | 37.9 surface-% |
| Lauric acid methyl ester: | 54.2 surface-% |
| Wax-like long-chain secondary products: | 5.2 surface-% |

COMPARISON EXAMPLE 1

A precipitate was obtained as in Example 1 by reaction of corresponding compounds in corresponding quantities, but without the Ludox AS 40, and was then calcined under the same conditions as in Example 1. The catalytically active mass was obtained in the form of a powder having a surface of 4 m²/s. 10 g of the powder were reacted with lauric acid methyl ester, again as in Example 1. The product was analyzed by gas chromatography:

| | |
|---|---|
| Lauric alcohol (dodecanol): | 7.3 surface-% |
| Lauric acid methyl ester: | 88.9 surface-% |
| Wax-like long-chain secondary products: | 1.4 surface-% |

The invention claimed is:

1. A process for the production of catalysts to be exposed to high temperatures of 700° C. to 1,200° C., wherein colloidal silica sols of which the silicon dioxide particles partly contain bound foreign metals are incorporated into a catalyst-forming mass in quantities below 15% by weight, expressed as silicon dioxide and based on the final catalyst, as an additive during production of the catalyst before the catalyst-forming mass is exposed to temperatures which lead to sintering.

2. A process as claimed in claim 1, wherein the colloidal silica sols contain silicon dioxide particles having a particle size of at least 5 nm and at most 30 nm.

3. A process as claimed in claim 2, wherein the colloidal silica sols contain silicon dioxide particles having a specific BET surface of 100-200 m²g.

4. A process as claimed in claim 3, wherein the colloidal silica sols have silicon dioxide contents of 10 to 50% by weight.

5. A process as claimed in claim 4, wherein the colloidal silica sols are added to the catalyst masses in quantities of 2 to 15% by weight, expressed as silicon dioxide solids and based on catalyst mass.

6. A process as claimed in claim 1, wherein the colloidal silica sols contain silicon dioxide particles having a specific BET surface of 100-200 m²/g.

7. A process as claimed in claim 6, wherein the colloidal silica sols have silicon dioxide contents of 10 to 50% by weight.

8. A process as claimed in claim 3, wherein the colloidal silica sols have silicon dioxide contents of 10 to 50% by weight.

9. A process as claimed in claim 2, wherein the colloidal silica sols have silicon dioxide contents of 10 to 50% by weight.

10. A process as claimed in claim 1, wherein the colloidal silica sols have silicon dioxide contents of 10 to 50% by weight.

11. A process as claimed in claim 10 wherein the colloidal silica sols are added to the catalyst masses in quantities of 2 to 15% by weight, expressed as silicon dioxide solids and based on catalyst mass.

12. A process as claimed in claim 3, wherein the colloidal silica sols are added to the catalyst masses in quantities of 2 to 15% by weight, expressed as silicon dioxide solids and based on catalyst mass.

13. A process as claimed in claim 2, wherein the colloidal silica sols are added to the catalyst masses in quantities of 2 to 15% by weight, expressed as silicon dioxide solids and based on catalyst mass.

14. A process as claimed in claim 9, wherein the colloidal silica sols are added to the catalyst masses in quantities of 2 to 15% by weight, expressed as silicon dioxide solids and based on catalyst mass.

15. A process as claimed in claim 8, wherein the colloidal silica sols are added to the catalyst masses in quantities of 2 to 15% by weight, expressed as silicon dioxide solids and based on catalyst mass.

16. A process as claimed in claim 7, wherein the colloidal silica sols are added to the catalyst masses in quantities of 2 to 15% by weight, expressed as silicon dioxide solids and based on catalyst mass.

* * * * *